United States Patent [19]
Matsuura

[11] Patent Number: 5,921,339
[45] Date of Patent: Jul. 13, 1999

[54] MOTORCYCLE FRAME

[75] Inventor: Tatsuya Matsuura, Iwata, Japan

[73] Assignee: Yamaha Hatsudoki Kabushiki Kaisha, Iwata, Japan

[21] Appl. No.: 08/696,031

[22] Filed: Aug. 9, 1996

[30] Foreign Application Priority Data

Aug. 11, 1995 [JP] Japan ................................. 7-205527

[51] Int. Cl.$^6$ ................................. B62D 61/02
[52] U.S. Cl. .................... 180/219; 180/226; 180/311; 280/274; 280/281.1
[58] Field of Search .................... 180/219, 226, 180/311; 280/274, 281.1, 283, 284, 285, 288

[56] References Cited

U.S. PATENT DOCUMENTS

| | | | |
|---|---|---|---|
| 4,433,747 | 2/1984 | Offenstadt | 280/284 |
| 4,445,585 | 5/1984 | Imani | 180/219 |
| 4,660,854 | 4/1987 | Suzuki et al. | 180/219 |
| 4,923,028 | 5/1990 | Yamashita et al. | 180/219 |
| 5,284,221 | 2/1994 | Warne | 180/219 |
| 5,377,776 | 1/1995 | Saiki | 180/219 |
| 5,704,442 | 1/1998 | Okazaki et al. | 180/311 |

FOREIGN PATENT DOCUMENTS

| | | | |
|---|---|---|---|
| 667474 | 10/1929 | France | 280/281.1 |
| 5-105159 | 4/1993 | Japan | 180/219 |
| 1594054 | 9/1990 | U.S.S.R. | 280/284 |
| 505050 | 5/1939 | United Kingdom | 280/285 |
| 521704 | 5/1940 | United Kingdom | 280/284 |

*Primary Examiner*—Daniel G. DePumpo
*Attorney, Agent, or Firm*—Knobbe, Marten, Olson & Bear LLP

[57] ABSTRACT

A generally open, welded-up type of motorcycle frame wherein the pivot axis for the rear wheel suspension system is disposed forwardly of the rear end of the frame so as to provide a large degree of suspension travel with small angular movements and without necessitating a large wheel base. The construction also minimizes torsional bending and sheering forces on the frame members that support the rear wheel.

10 Claims, 5 Drawing Sheets

MOTORCYCLE FRAME

BACKGROUND OF THE INVENTION

This invention relates to a motorcycle frame and more particularly to an improved, welded-up frame assembly for a motorcycle that provides a more rigid structure for mounting of the rear wheel of a motorcycle.

As is well known, motorcycles generally include a frame assembly that is made up of a welded-up construction. The typical frame construction includes a headpipe at the front of the frame and which dirigibly supports the front wheel via a steerable front fork assembly. From this headpipe, there extends generally rearwardly and in somewhat downward fashion one or more main tubes. In addition, down tubes also are affixed at their forward ends to this headpipe and extend downwardly and rearwardly. At the rear ends, the main tubes and down pipes are joined, frequently by a bracket assembly. This bracket assembly provides a support for the rear wheel and/or the rear wheel suspension mechanism. Although the shape of the individual frame members may vary, the described construction generally is the type utilized on the great majority of the motorcycles.

In addition to supporting the front and rear wheels, the frame assembly must also provide the space for the powering internal combustion engine and the transmission and drive arrangement for driving the rear wheel. The open type of frame construction generally employed is desirable because it offers easy access to the various mechanical components of the motorcycle for servicing and/or replacement.

Although the type of structure described is generally serviceable and satisfactory, the positioning of the rear wheel support at the extreme rear end of the frame gives rise to certain undesirable structural features. First, the loading of the frame members, because of this construction, is such that there are substantial bending and/or shearing forces exerted on the frame members. It is obviously particularly desirable to load the frame members primarily in tension or compression.

In addition, this rearward positioning of the suspension point results in the difficulty in providing large suspension travels, if the rear wheel is supported for suspension movement relative to the frame. Trailing arm constructions are generally employed for this purpose, and if the trailing arm has a pivotal point at the rear end of the frame, then the wheelbase of the bike becomes elongated considerably in order to provide a long trailing arm. This is not particularly desirable from a ride standpoint.

It is, therefore, a principal object of this invention to provide an improved and compact frame assembly for a motorcycle.

It is a further object of this invention to provide a generally built-up type of frame assembly wherein the rear wheel suspension and frame cooperate in such a way so as to minimize bending loading on the frame members and to, at the same time, permit a large suspension travel while maintaining a manageable wheelbase.

It is a further object of this invention to provide an improved high-strength frame assembly that nevertheless is compact in construction and facilitates the ease of servicing of the components of the motorcycle carried by the frame.

SUMMARY OF THE INVENTION

This invention is adapted to be embodied in a frame assembly for a motorcycle that is comprised of a headpipe for dirigibly supporting a front fork and a front wheel journaled thereby. A main tube is connected at its forward end to the upper part of the headpipe and extends rearwardly and downwardly therefrom. A down tube is affixed at its forward end to the headpipe below the main tube and extends downwardly and rearwardly therefrom. The main tube and the down tube terminate contiguous to a rear wheel of the motorcycle. A connecting member is provided which connects the lower rearward end of the down tube and the rearward end of the main tube to provide an open tubular frame having a closed configuration in side elevational view. Means are provided for defining a fixed pivot axis for a rear wheel suspension unit that is spaced forwardly of the rear ends of the main and down tubes and within the closed configuration of the frame in side elevational view.

DETAILED DESCRIPTION OF THE PREFERRED EMBODIMENT OF THE INVENTION

Figure 1:
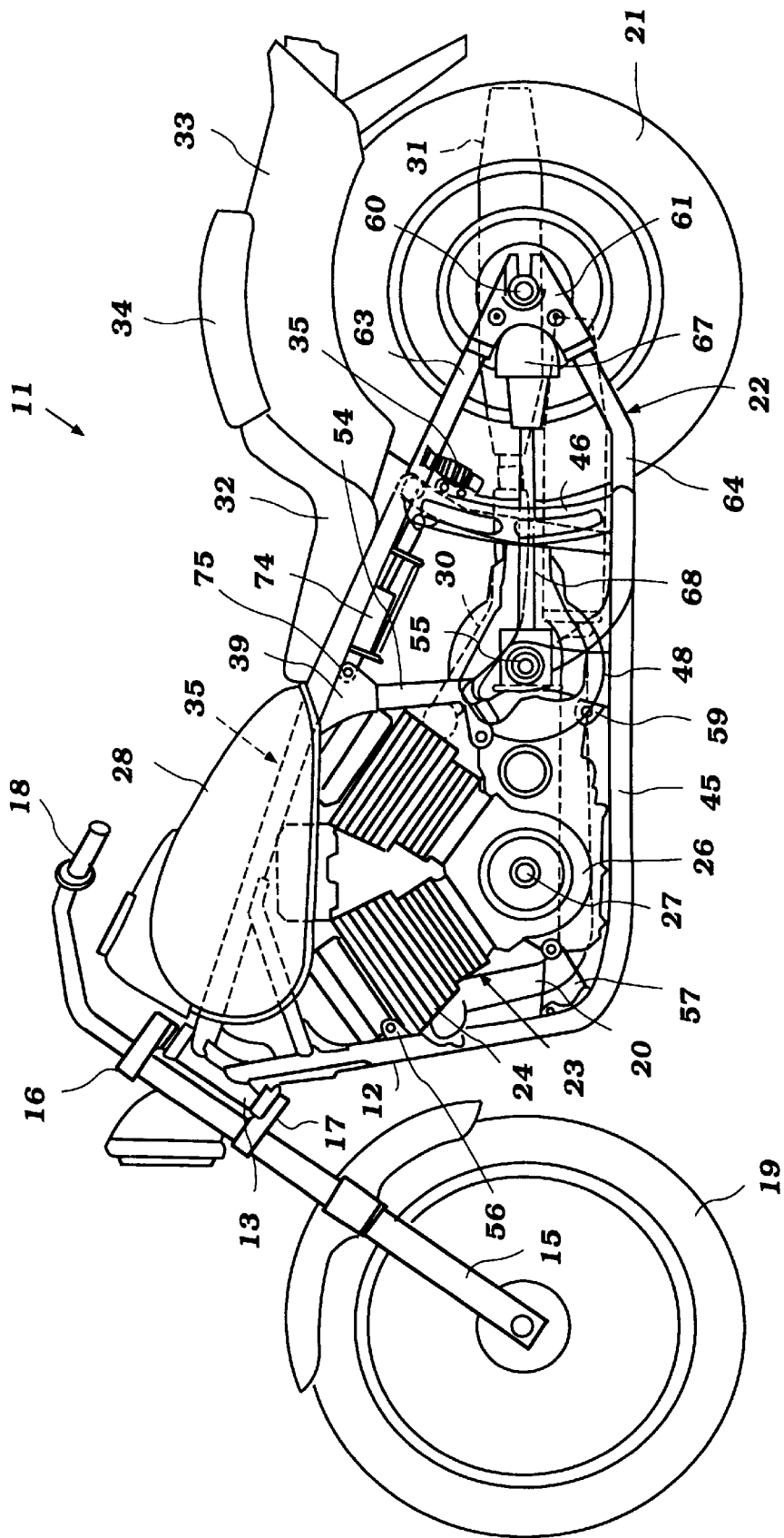
FIG. 1 is a side elevational view of a motorcycle having a frame constructed in accordance with an embodiment of the invention.

Referring now in detail to the drawings and initially primarily to FIG. 1, a motorcycle constructed in accordance with an embodiment of the invention is identified generally by the reference numeral 11. The motorcycle 11 includes a welded-up type of tubular frame assembly, indicated generally by the reference numeral 12. This frame assembly 12 is formed primarily from tubular members which may have round or other suitable configurations, and includes a headpipe 13. The construction of the frame 12 will be described later in more detail by reference to FIGS. 2–4.

The headpipe 13 journals a front fork assembly 15 by means including a pair of upper and lower brackets 16 and 17. A handlebar assembly 18 is carried at the upper end of this front fork 15 for steering of a front wheel 19 which is rotatably journaled at the lower end of the fork 15 in a known manner.

At the rear end of the frame assembly 12, a rear wheel 21 is suspended by means of a welded-up trailing arm assembly, indicated generally by the reference numeral 22, for suspension movement about a pivot point, to be described, which is formed by the main frame assembly 12 and forwardly of the rear terminus thereof.

An internal combustion engine, indicated generally by the reference numeral 23, is supported within the open portion of the frame assembly in a manner which will be described. The engine 23 may be of any desired configuration, but a V-type engine is depicted so as to show how the frame assembly will accommodate relatively large engines and still render those engines accessible without sacrificing the features of strength and ease of accessibility.

The engine, therefore, has a pair of angularly inclined cylinder banks 24 and 25 in each of which one or more cylinder bores are formed. These cylinder banks 24 and 25 are joined to a combined crankcase transmission assembly, indicated generally by the reference numeral 26, in which the engine crankshaft 27 rotates about an axis that extends transversely to the longitudinal center line of the motorcycle 11. As is typical, the crankcase transmission assembly 26 includes a change speed transmission which, in the preferred embodiment of the invention, has a transversely extending output shaft which drives the rear wheel 21 in a manner which will also be described.

Mounted on the frame assembly 12 rearwardly of the handlebar assembly 18 and headpipe 13, and nested therebetween, is a fuel tank 28. The fuel tank 28 supplies fuel to the engine 23 through a suitable fuel supply system. In addition, a charge forming system of any known type, and one which is preferably at least partially positioned between the cylinder banks 24 and 25, delivers a combustible mixture to the engine. This mixture is then burned and discharged to the atmosphere through an exhaust system which includes, in part, exhaust manifolds 29 and 30 and a muffler, tailpipe assembly 31. Since the invention deals primarily with the frame 12, further details of the construction and operation of the engine 23 and its auxiliaries is not believed to be necessary to permit those skilled in the art to practice the invention. However, from the following description, it will be readily apparent to those skilled in the art how the frame assembly 12 provides maximum access for servicing of the various components of the motorcycle 11.

A rider's seat 32 is carried by the frame assembly 12 to the rear of the fuel tank 28 and accommodates the rider/operator. A fender 33 covers the rear wheel 23 and carries an auxiliary seat 34 for accommodating a passenger. The passenger 34 may place his or her feet on footrests 60 carried at opposite sides of the frame assembly 12 at the rear thereof in a manner which will be described.

It is to be understood that the layout of the various components carried by the frame assembly 12 may also be of any known type and/or configuration. Again, however, from the description of the frame assembly, it is believed to be readily apparent how the invention permits a wide variety or wide latitude of configurations to be employed and accommodated without sacrificing accessibility of the various components.

Figure 2:
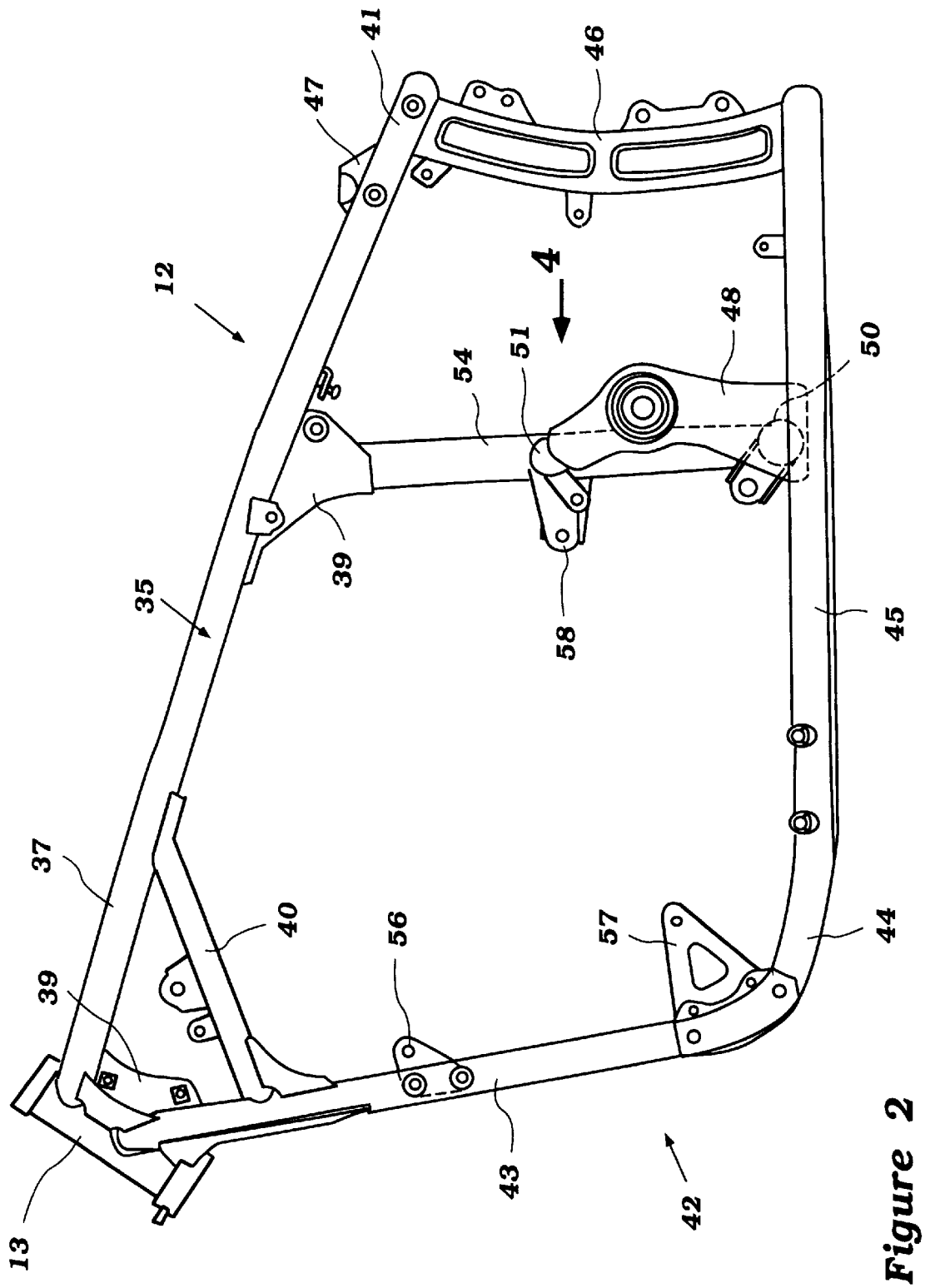
FIG. 2 is an enlarged side elevational view showing the frame assembly employed in the motorcycle illustrated in FIG. 1.
Figure 3:
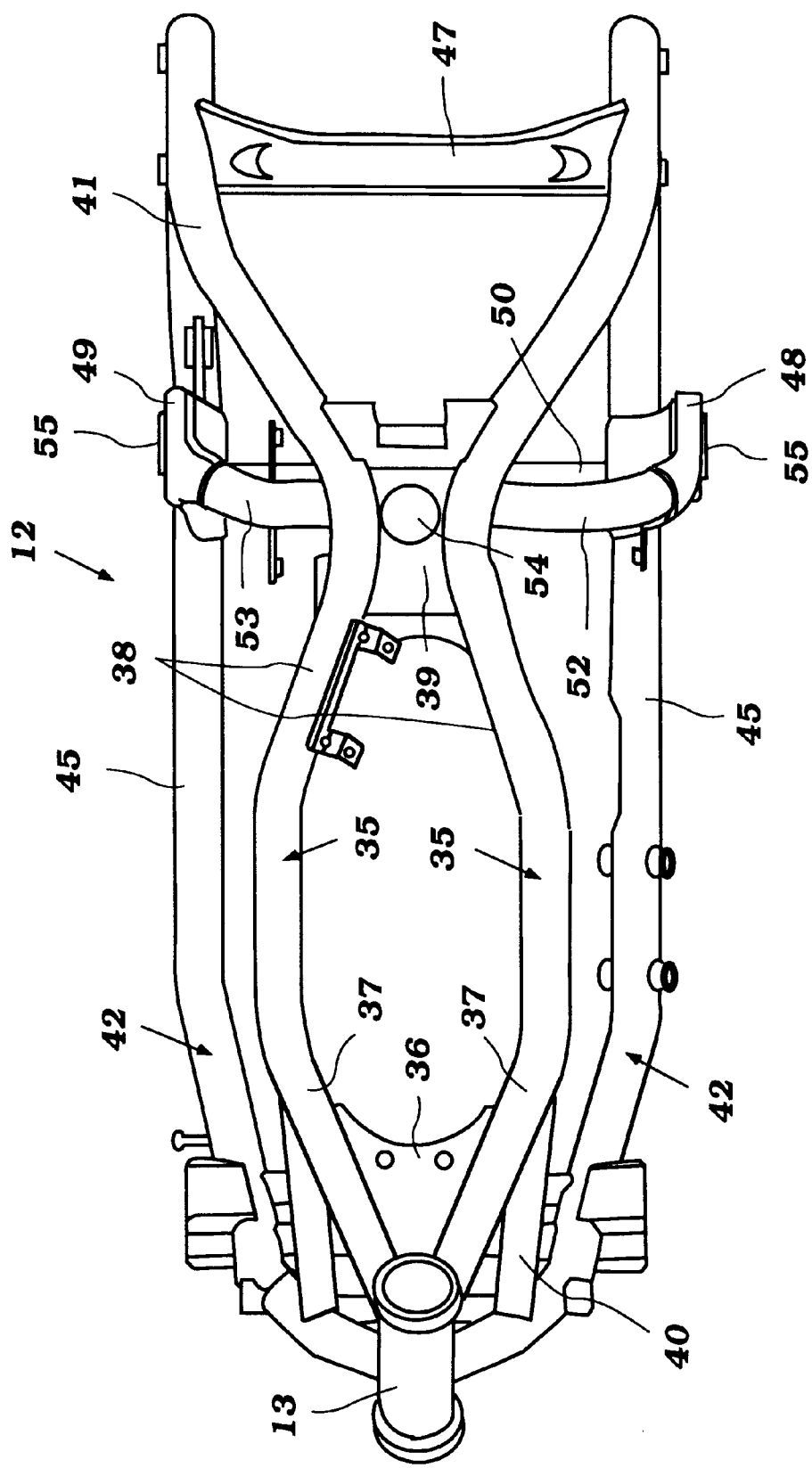
FIG. 3 is an enlarged top plan view of the frame assembly.

The construction of the frame assembly 12 will now be described in more detail, and by particular reference to FIGS. 2–4. Although these figures are employed to describe the frame construction, it is obviously apparent that the frame components, or at least major portions of them, also appear in FIG. 1.

As has been noted, a headpipe 13 dirigibly supports the front wheel 19 and its supporting fork assembly 15. The headpipe is disposed at the upper forwardmost portion of the frame assembly 12 and defines a steering axis that is inclined rearwardly from a vertical plane at an acute angle. A pair of main frame members, each indicated by the reference numeral 35, are connected at their forward ends to the headpipe 13, as, for example, by welding. In the illustrated embodiment, the main tubes 35 are tubular. As has been noted, however, these main frame tubes 35 may have any desired configuration.

A reinforcing gusset 36 is welded between the headpipe 13 and the main tubes 35 at their forward ends and where the main tubes 36 diverge outwardly toward a pair of parallel sections 37 that run substantially along the area where the fuel tank 28 is positioned. Rearwardly of this area, and forwardly of but in proximity to the front part of the rider's seat 32, these main tubes 35 have converging portions 38 which are joined to a reinforcing bracket 39 which serves a purpose which will be described later.

Rearwardly of this bracket 39, the main tubes 35 bow outwardly again to provide spread-apart rear sections 41, which extend parallel to but are disposed substantially transversely outwardly of the forward portions 37. This entire configuration also is inclined downwardly and rearwardly, as best seen in FIGS. 1 and 2.

Affixed to the headpipe 13 downwardly and slightly forwardly of the point of connection of the main tubes 35 are a pair of down tubes, indicated generally by the reference numeral 42. In the illustrated embodiment, the down tubes 42 are also tubular in configuration, and the reinforcing gussets 36 may also function to reinforce their upper connections to the headpipe 13. The forward portion of the down tubes 42 extends generally vertically downwardly in relatively straight sections 43. These sections curve at 44 at their lower ends and then the down tubes 42 extend rearwardly in a generally horizontal direction with portions 45 forming this configuration. It should be seen that the portions 45 are spaced generally transversely outwardly of the main tube portions 37. This provides a wider support base while maintaining a relatively narrow upper portion so as to permit a more comfortable riding position for the rider.

Reinforcing cross-members 40 are interconnected between mid-points of the main tubes 37 and corresponding upper portions of the down tubes 42 so as to add to the rigidity of the structure without interfering with its generally open configuration.

It will be seen that the main tubes 35 and down tubes 42, and specifically the rearward portions thereof, comprised of the parts 41 and 45, terminated adjacent and forwardly of the rear wheel 21. Thus, the rear ends of these portions are spaced apart and arcuate vertical extending bridging reinforcing brackets 46 are welded therebetween so as to form a generally closed configuration, as seen in side elevational view. At the upper ends of the brackets 46, there is provided a reinforcing cross-member 47 which is also affixed, as by welding, across the upper ends of the main tube portions 41 and in proximity to the brackets 46. Again, this permits a rigid but well-open construction.

In conventional type of motorcycle frames having the general configuration as described, the rear ends of the down tubes 42 and main tubes 35 are positioned relatively close to each other and are joined by a bracket that provides a pivot axis for a suspension system for the rear wheel. This prior art construction has the aforenoted deficiencies and they are avoided with this invention.

In accordance with this invention, the rear ends of the main tube portions 41 and down tube portions 45 are spaced apart a considerable vertical distance and are bridged by the reinforcing bridging brackets 46 to provide a more open configuration. This is not only stronger, but also affords much better access to the various mechanical components of the motorcycle.

In this construction, the rear wheel suspension is provided by means of a cross-brace assembly comprised of a pair of side brackets 48 and 49, each of which is affixed to a respective one of the down tube portions 45 well forwardly of the reinforcing brackets 46. These brackets 48 and 49 have affixed to their upper ends respective tubular portions 52 and 53 which, as will be seen in FIG. 4, have different vertical extents. The portion 52 extends higher than the portion 53, where the portions cross over toward the longitudinal center of the motorcycle. This provides clearance on the left-hand side, as seen in FIG. 2, for the drive shaft and other components for the rear wheel suspension system, as will become apparent. These portions 52 and 53 are of a generally tubular configuration; however, other configurations may be employed.

Where the portions 52 and 53 meet in an offset manner at the longitudinal center of the motorcycle 11, they are connected to a vertically extending frame tube 54. This frame tube 54 is connected at its lower end to a reinforcing cross-tube 50 that spans the lower tube portions 45 forwardly of the brackets 46 and which is welded thereto. The upper end of this reinforcing tube 54 is welded to the aforenoted reinforcing bracket 39 so as to provide a very rigid structure that is disposed within the open portion of the frame assembly 12, without significantly obstructing it.

Each of the side members 48 and 49 forms a respective pivot joint 55 for the rear wheel suspension system, as will be described shortly. As may be seen in the view of FIG. 4, the reinforcing tube 54 preferably has an oval configuration, as shown at 54a, in FIG. 4. This provides a wider area for support and more extent in the fore and aft or longitudinal direction than in the transverse direction so as to provide good strength and minimum weight.

The vertical portions 43 of the down tubes 42 carry upper and lower engine mounts 56 and 57, respectively, that are connected to the front cylinder bank 24 and crankcase transmission assembly 26 for supporting the forward end of the engine 23. The rear cross-tubes 52 and 53 carry brackets 58, and the lower tube 50 carries brackets 59, which support the transmission crankcase assembly 26 at the rear end so as to provide good support therefor, and again to offer open and easy access.

The trailing arm construction 22 will now be described by particular reference to FIG. 5, while its connection to the frame assembly 12, as thus far described, will subsequently be described by reference to FIGS. 1 and 4. Referring first to FIG. 5, the trailing arm assembly 22 includes a pair of spaced-apart brackets 61 that have slotted ends 62 for receiving the axle shaft 60 upon which the rear wheel 21 is journaled. The brackets 61 are connected at their upper ends to a U-shaped tubular member 63. The lower portions of the brackets 61 are connected by means of a longer U-shaped tubular member 64.

A cross-brace or cross-member 65 spans the forward arm portions of the lower member 64. Reinforcing tubes 66 are welded between this cross-member 65 and the upper tubular member 63 so as to provide a very rigid structure.

The bracket 61 at one side of the motorcycle carries a final drive housing 67 that contains a ring and pinion gear for driving the rear wheel 21 in a known manner. The pinion gear of this final drive is driven by a drive shaft that is journaled within a drive shaft housing 68 that extends forwardly and which forms a coupling member 69 for disconnectable connection to the aforenoted output shaft of the transmission in the crankcase transmission assembly 26.

Figure 4:
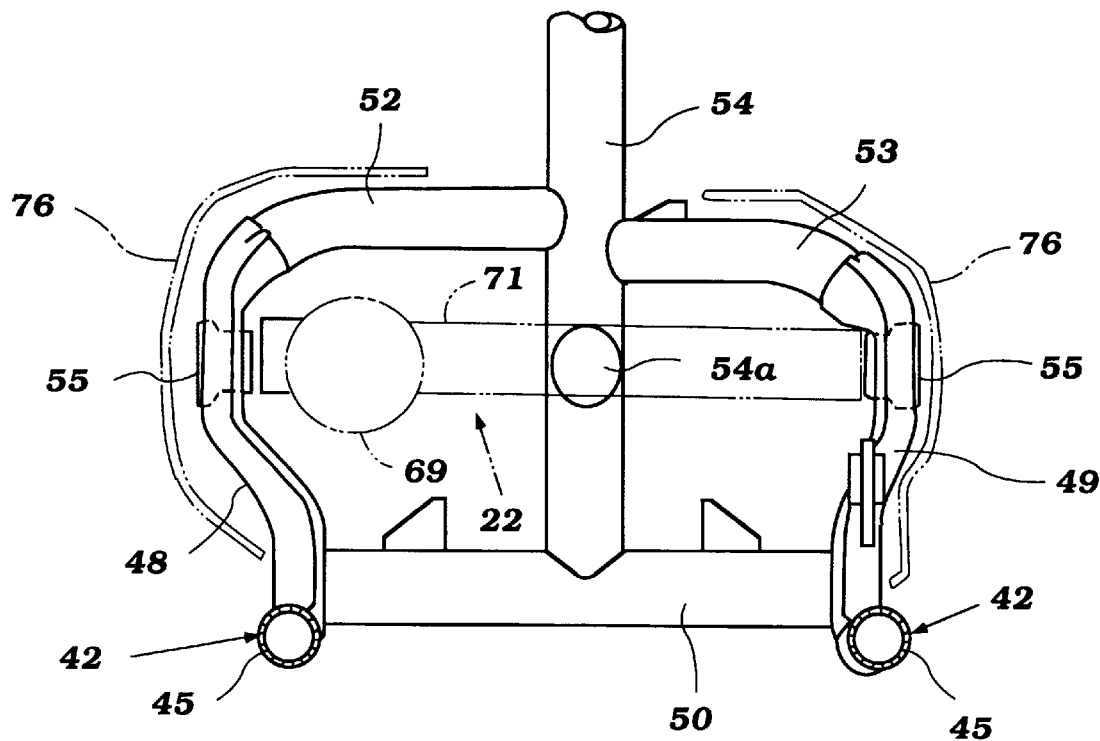
FIG. 4 is a view of the frame assembly looking generally in the direction of the arrow 4 in FIG. 2, with portions of the frame assembly broken away and shown in section, and also with the surrounding body portions of the motorcycle shown in phantom.
Figure 5:
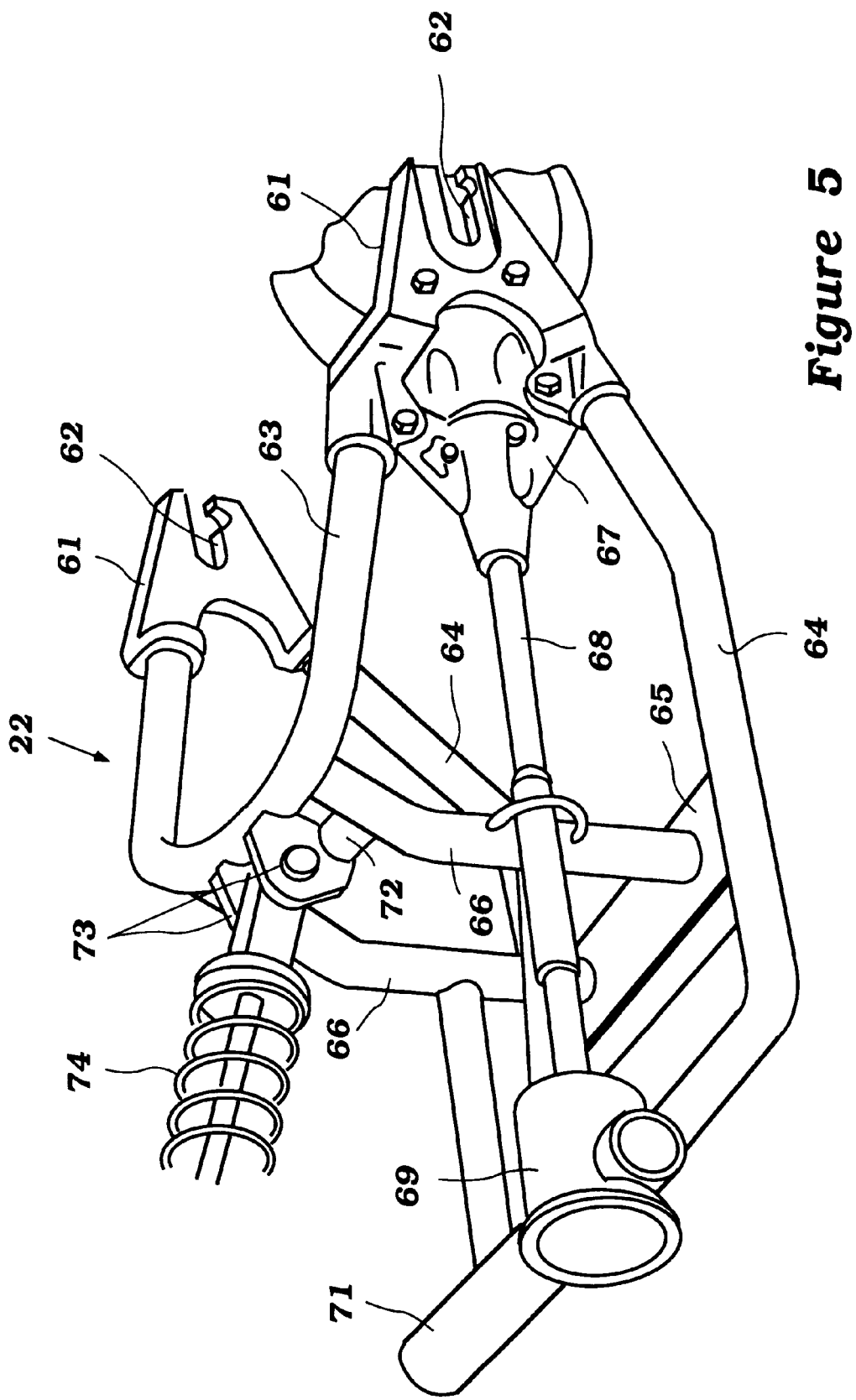
FIG. 5 is an enlarged side perspective view showing the rear wheel suspension arm and the drive arrangement for the rear wheel of the motorcycle that cooperates with the frame shown in FIGS. 2–4.

This coupling member is affixed to a cross-tube 71 which, as seen in FIG. 4, provides the pivotal connection to the pivot point 55 for pivotal movement of the trailing arm assembly 22 relative to the main frame 12. This pivot point is well forward so that a large wheel suspension is available with small pivotal degrees of pivotal movement for a relatively large vertical movement of the wheel 21, unlike the previous prior art type of constructions.

As may be seen in FIGS. 5 and 1, the cross-braces 66 are interconnected by a cross-tube 72 that carries a mounting assembly for a pivot pin 73 that is connected to a combined spring and shock absorber mechanism 74. The opposite end of this spring and shock absorber member 74 is pivotally connected as at 75 to the upper bracket 39 of the frame assembly so as to load the spring and shock absorber assembly 74 upon suspension movement of the rear wheel.

As may be seen in FIG. 4, body covers 76 may be affixed to and overlie portions of the frame assembly to give a neat appearance while, at the same time, facilitating servicing through ready removal.

Thus, from the foregoing description, it should be readily apparent that the described frame assembly is extremely robust, and yet provides an open configuration so that servicing is very possible. In addition, the forward pivot point for the trailing arm 22 permits large degrees of suspension travel without large angular movements and without necessitating a long wheel base. Of course, those skilled in the art will readily understand that the foregoing description is that of preferred embodiments of the invention, and various changes and modifications may be made without departing from the spirit and scope of the invention, as defined by the appended claims.

What is claimed is:

1. A frame assembly for a motorcycle comprised of a headpipe for dirigibly supporting a front fork and a front wheel journaled thereby, a main tube connected at its forward end to an upper portion of said headpipe and extending rearwardly and downwardly therefrom, a down tube, said down tube being affixed at a forwardmost end to said headpipe below said main tube and extending downwardly and rearwardly from said headpipe, said main tube and said down tube terminating contiguous to a rear wheel and in spaced vertical relationship to each other, a vertically extending frame member interconnecting the rear ends of said main tube and said down tube to form a closed configuration in side elevational view, and means for defining a fixed pivot axis for a rear wheel suspension unit spaced forwardly of the rear ends of said main tube and said down tube and said vertically extending frame member, said fixed pivot axis lying at a vertical height between said rear ends of said main tube and said down tube and within the closed configuration of said frame in side elevation.

2. A frame assembly as set forth in claim 1, further including a cross-brace assembly extending between a horizontally extending portion of the down tube and the main tube and which forms, in part, the fixed pivot axis.

3. A frame assembly as set forth in claim 2, wherein the cross-brace assembly extends substantially forwardly of the vertically extending frame member and substantially completely between the down tube and the main tube.

4. A frame assembly as set forth in claim 3, wherein the pivot axis is provided at a location that lies vertically between upper and lower ends of the cross-brace assembly.

5. A frame assembly as set forth in claim 1, further including a second main tube and down tube each connected at their front ends to the head pipe and having their rear ends vertically spaced from each other and connected by a second vertically extending frame member, said second main tube, said second down tube and said second vertically extending frame member being transversely spaced from the respective, first mentioned frame member.

6. A frame assembly as set forth in claim 5, wherein each of the main tubes and down tubes forms, at the respective side of the frame, a respective pivot axis for the rear wheel suspension.

7. A frame assembly as set forth in claim 6, wherein the cross-brace assembly is comprised of an assembly that spans a portion of the transverse area between the main tubes and the down tubes at each side of the frame.

8. A frame assembly as set forth in claim 7, wherein the cross-brace assembly extends substantially forwardly of the vertically extending frame members and substantially completely between the down tubes and the main tubes.

9. A frame assembly as set forth in claim 8, wherein the main tubes converge in the area of the cross-brace assembly so as to provide a narrow area in the area between the legs of a rider of the motorcycle.

10. A frame assembly as set forth in claim 9, wherein the cross-brace assembly includes an upper cross-brace extending between the main tubes, a lower cross-brace extending between the down tubes and a vertically extending post extending vertically therebetween for providing rigidity.

* * * * *